July 24, 1951 M. J. ROSBY 2,561,952
MULTIPLE POSITION POT HANDLE
Filed May 13, 1946
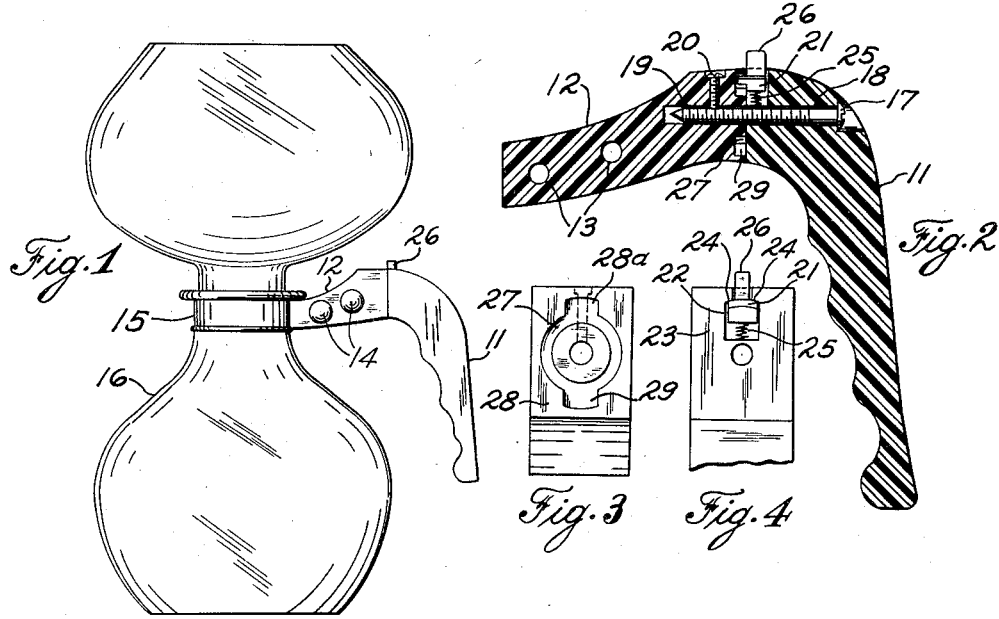
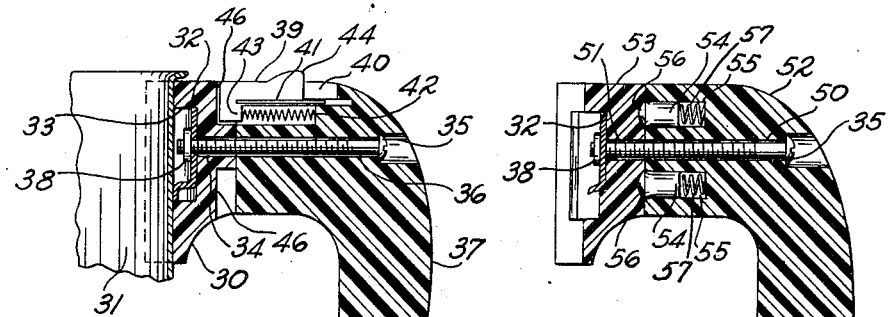
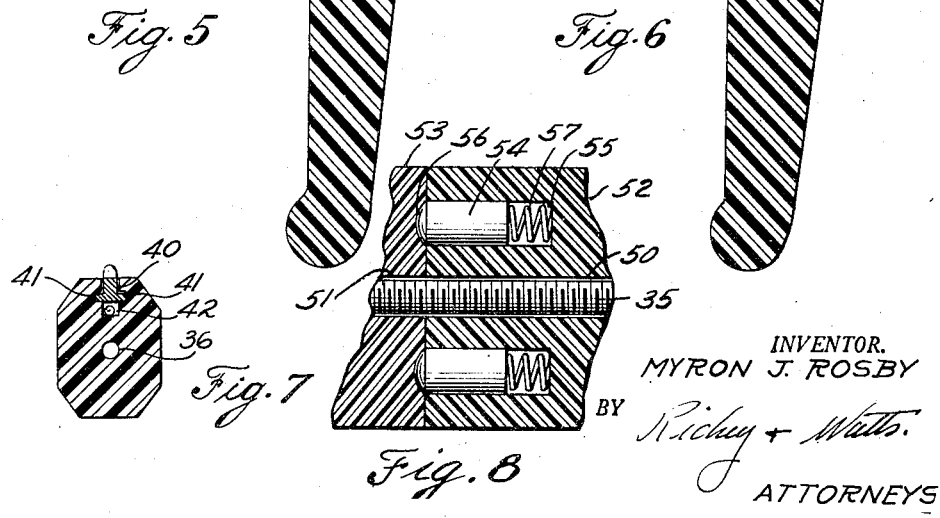
INVENTOR.
MYRON J. ROSBY
BY Richey + Watts
ATTORNEYS Patented July 24, 1951

2,561,952

UNITED STATES PATENT OFFICE 2,561,952

MULTIPLE POSITION POT HANDLE

Myron J. Rosby, Parma, Ohio

Application May 13, 1946, Serial No. 669,306

4 Claims. (Cl. 16—110)

This invention relates to handles for cooking utensils, and is directed to the provision of an improved handle which may be disposed downwardly or upwardly from its point of attachment to the utensil, and locked in either position.

Many cooking utensils are provided with generally vertical handles offset from the side of the utensil and secured thereto, at the upper end of the handle. Since such handles often become uncomfortably hot from close exposure to a heat source, in some cases handles are made detachable to avoid this disadvantage, but detachable handles are easily mislaid.

The improved handle is mounted so that it may be rotated about a generally horizontal axis, and incorporates a latch or detent to retain it with the handle directed either downwardly or upwardly so that it may be used to handle the utensil, or for pouring, in either position as may be desired. Used upwardly, exposure of the handle to the heat source is reduced to a minimum.

The improved handle may also be used on such utensils as dippers, in which case it may be rotated upwardly for dipping, and downwardly for convenience in drinking.

An object of the invention is to provide a handle which may be used either in a downwardly directed position or in an upwardly directed position.

Another object of the invention is to provide a handle which is capable of being rotated to several positions and may be retained in either of several positions so that it may be readily used.

Another object of the invention is to provide a handle of the character described which may be readily mounted on cooking utensils of various types.

A further object of the invention is to provide a handle which is attractive in appearance, simple in construction, and economical to manufacture.

Other objects and advantages more or less ancillary to the foregoing and the manner in which all the various objects are realized will appear in the following description, which, considered in connection with the accompanying drawings, sets forth the preferred embodiment of the invention.

Referring to the drawings:

Fig. 1 is an elevation view of a cooking utensil provided with one form of handle assembly according to the invention;

Fig. 2 is a vertical section of the handle assembly of Fig. 1;

Fig. 3 is an elevation of the mounting portion of the handle assembly;

Fig. 4 is a partial elevation of the handle portion of the assembly;

Fig. 5 is a vertical section of a modified form of handle assembly;

Fig. 6 is a vertical section of still another modified form of the handle;

Fig. 7 is a cross section of the form of handle shown in Fig. 5; and

Fig. 8 is an enlarged, fragmentary, vertical sectional view of the handle and bracket assembly of Fig. 6, showing the detent and spring assembly in detail.

The handle assembly illustrated in Fig. 2 comprises a handle 11, and a mounting bracket 12, the mounting bracket being provided with transverse holes 13 through which rivets or bolts 14 may be passed to hold the bracket 12 in clamped relation between the ends of a strap 15 engaged between shoulders on utensil 16. The two parts of the handle assembly are secured together by a screw seated in a counter-bored hole 18 in the handle and threaded into a hole 19 in the mounting bracket, the screw providing an axis of rotation for the handle. The screw 17 may be retained by a set screw 20 threaded into the mounting bracket and engaging the screw 17. The screw 17 maintains the plane mating faces of the handle and mounting bracket in opposed relation under any suitable degree of compression.

In order to retain the handle in its downwardly directed position, as shown in Fig. 2, or in an upwardly directed position, a latching device is provided. The latching device comprises a catch 21 mounted in a vertical slot 22 formed in the face 23 of the handle and urged upwardly against shoulders 24 by a coil spring 25 compressed between the bottom of the catch and the bottom of the slot. A thumb piece 26, extending through the reduced upper portion of the slot provides a means for pressing the catch 21 toward the axis of rotation. The catch 21 engages in an annular slot 27 formed in the vertical face 28 of the mounting bracket, slot 27 being formed with an upwardly directed pocket 28a and a downwardly directed pocket 29. Normally, the catch 21 is pressed outwardly from the axis of rotation by the spring 25, and is retained in either of the two pockets 28a and 29. When it is desired to rotate the handle to its alternative position, the thumb piece 26 is pressed in, releasing the catch and permitting rotation of the handle 180 degrees, until the catch engages in the opposite pocket under the action of the spring.

The form of handle shown in Fig. 5 is distinguished from that shown in Fig. 2 by the provision of a different form of latch and different means for mounting it on a cooking utensil. The mounting bracket 30 is provided with a cylindrical surface adapted to conform to the outer surface of a cylindrical utensil 31. Such utensils are commonly provided with a strap 32, spaced slightly from the wall of the pot, and formed with a hole through which a bolt may be passed for mounting a handle. A recess 33 is formed in the mounting bracket to accommodate the strap 32, and a hole 34 is formed therein for clearance over a bolt 35 which passes through a counterbored hole 36 in the handle 37, and is engaged in a nut 38 inserted behind the strap 32. The bolt thus serves to retain the handle on the mounting bracket and the mounting bracket against the pot, and to provide an axis of rotation for the handle. The catch 39 is mounted for horizontal sliding movement in a cruciform slot 40, formed in the handle 37, ribs 41 of the catch being guided in the horizontally extending portions of the slot. A compression spring 42 is retained in the lower portion of the slot between its inner wall and a downwardly extending portion 43 of the catch 39. By means of a thumb piece 44, the catch may be retracted against the force of spring 42 from its position of lodgment in either of two vertical slots 46, formed in the outer surface of the mounting bracket 30. The slots 46 are directed upwardly and downwardly respectively from the axis of rotation so that the handle may be latched in either its upward or downward position.

The modified form of handle illustrated in Fig. 6 is designed for attachment to a pot in the same manner as the form of Fig. 5, by a bolt 35 passing through clearance holes 50 and 51 in the handle 52 and in the mounting bracket 53, respectively. A nut 38 retained against the inner surface of the strap 32 maintains the parts in juxtaposition. A simpler form of detent is employed in this modification. Spring urged detents 54 of conventional type are pressed by springs 57 into holes 55 in the face of the handle parallel to the bore 50 and on opposite sides thereof. The detents engage in shallow rounded depressions 56 formed in the outer face of the mounting bracket, the relative positions of the detents 54 and the depressions 56 being such that the handle is retained in either vertical position. If desired, a set screw 20 such as is shown in Fig. 1 may be incorporated in the devices of Figs. 5 and 6 to insure against rotation of the bolt with the handle.

The handles and mounting brackets, as well as the latches, may be formed from any suitable material, molded plastic material such as Bakelite or methyl methacrylate being regarded as quite suitable. Obviously, the type of mounting bracket illustrated in Fig. 2 may be used with either of the detent means illustrated in Figs. 5 and 6, and the latch in Fig. 2 may be used with a bracket of the form illustrated in Figs. 5 and 6, or any suitable latching or detent device may be employed. While certain mounting means adaptable to particular forms of utensils have been shown, it is apparent that the form of the mounting bracket may be modified to suit utensils having other types of construction than those shown herein.

Although the foregoing description is necessarily of a detailed character, in order that the invention in pot handles for cooking utensils may be completely set forth, it is to be understood that the specific terminology is not intended to be restrictive or confining, and that various rearrangements of parts and modifications of detail may be resorted to without departing from the scope or spirit of the invention as herein claimed.

I claim:

1. An adjustable handle assembly for use with a cooking vessel such as a coffee pot comprising a mounting bracket to be secured to such a vessel, a handle associated with the bracket and rotatable relative thereto, said bracket and handle having engaged portions provided with openings in register with each other, means comprising a screw extending through the registered openings for holding said handle and bracket in assembled relation, means for maintaining the screw stationary relative to the bracket, and latching means carried by the handle and engageable with the bracket for maintaining the handle in predetermined position relative to the bracket and vessel.

2. An adjustable handle assembly for use with a cooking vessel such as a coffee pot comprising a mounting bracket to be secured to such a vessel, a handle associated with the bracket and rotatable relative thereto, said bracket and handle having engaged portions provided with openings in register with each other, means comprising an elongated screw extending through the registered openings and engaging the handle and the bracket for holding said handle and bracket in assembled relation, means comprising a set screw carried by the bracket for maintaining the elongated screw stationary relative to the bracket, and latching means carried by the handle and engageable with the bracket for maintaining the handle in predetermined position relative to the bracket and vessel, said latching means including a catch having a thumb piece projecting from the handle for manipulation of the catch to disengage said catch and the bracket, and a spring in the handle bearing upon the catch and resiliently urging the catch radially outwardly relative to the elongated screw and into engagement with the bracket.

3. An adjustable handle assembly for use with a cooking vessel such as a coffee pot comprising a mounting bracket to be secured to such a vessel, a handle associated with the bracket and rotatable relative thereto, said bracket and handle having engaged portions provided with openings in register with each other, means comprising an elongated screw extending through the registered openings and engaging the handle for holding said handle and bracket in assembled relation, means comprising a nut screwed onto one end of the elongated screw for maintaining the said screw stationary relative to the bracket, and latching means carried by the handle and engageable with the bracket for maintaining the handle in predetermined position relative to the bracket and vessel, said latching means including a catch having a portion projecting from the handle for manual adjustment of the catch to disengage said catch from the bracket, and a spring in the handle bearing upon the catch and resiliently urging said catch longitudinally of the screw and into engagement with the bracket.

4. An adjustable handle assembly for use with a cooking vessel such as a coffee pot comprising a mounting bracket to be secured to such a vessel, a handle associated with the bracket and rotatable relative thereto, said bracket and handle having engaged portions provided with openings in register with each other, means comprising an elongated screw extending through the registered openings and engaging the handle for holding said handle and bracket in assembled relation, means for maintaining the screw stationary relative to the bracket, and latching means carried by the handle and engageable with the bracket for maintaining the handle in predetermined position relative to the bracket and vessel, said latching means including a pair of detents in the handle and having portions extending from said engaged portion of the handle and engaging the bracket, and springs within the handle bearing on the detents and resiliently urging them into engagement with the bracket.

MYRON J. ROSBY.

REFERENCES CITED

The following references are of record in the file of this patent:

UNITED STATES PATENTS

| Number | Name | Date |
|---|---|---|
| 188,422 | Seal | Mar. 13, 1877 |
| 1,442,362 | Saxe | Jan. 16, 1923 |
| 1,442,363 | Saxe | Jan. 16, 1923 |
| 1,476,194 | Dismond | Dec. 4, 1923 |
| 2,124,713 | Ruelland | July 26, 1938 |
| 2,172,524 | Stevens | Sept. 12, 1939 |